United States Patent [19]
Abe et al.

[11] Patent Number: 5,096,014
[45] Date of Patent: Mar. 17, 1992

[54] REAR WHEEL STEERING MECHANISM WITH LOCKING CONTROL FOR FOUR-WHEEL-STEERABLE VEHICLE

[75] Inventors: Masaru Abe; Toru Yasuda; Yoshimichi Kawamoto; Takashi Kohata, all of Saitama, Japan

[73] Assignee: Honda Giken Kogyo Kabushiki Kaisha, Tokyo, Japan

[21] Appl. No.: 333,870

[22] Filed: Apr. 4, 1989

Related U.S. Application Data

[63] Continuation of Ser. No. 85,470, Aug. 13, 1987, abandoned.

[30] Foreign Application Priority Data

Aug. 20, 1986 [JP] Japan .................. 61-194993

[51] Int. Cl.⁵ .............................................. B62D 5/04
[52] U.S. Cl. ...................................... 180/140; 280/91
[58] Field of Search .............. 280/91; 180/79.1, 140, 180/142, 148

[56] References Cited

FOREIGN PATENT DOCUMENTS

61-31972  2/1986  Japan .
61-64584  4/1986  Japan ........................... 280/91
61-196870  9/1986  Japan .

Primary Examiner—Mitchell J. Hill
Attorney, Agent, or Firm—Irving M. Weiner; Joseph P. Carrier; Pamela S. Burt

[57] ABSTRACT

A four-wheel-steering system includes a rear wheel steering mechanism for turning rear wheels in response to energization of an actuator. A locking device is responsive to de-energization of the actuator for locking gears and a rack shaft to prevent the rear wheels from being turned. The locking device includes a longer arm on which first and second gears are rotatably mounted, a shorter arm pivotally coupled to the longer arm, a stopper coupled to the shorter arm and engageable with the second gear, and a spring acting on the stopper for normally urging the stopper into engagement with the second gear, the actuator comprising an electric motor angularly movable with respect to the second gear.

4 Claims, 2 Drawing Sheets

REAR WHEEL STEERING MECHANISM WITH LOCKING CONTROL FOR FOUR-WHEEL-STEERABLE VEHICLE

This is a continuation of application Ser. No. 085,470, filed Aug. 13, 1987 now abandoned.

BACKGROUND OF THE INVENTION

1. Field of the Invention

The present invention relates to a rear wheel steering mechanism for a four-wheel-steerable (4WS) vehicle, the rear wheel steering mechanism having an acuator for turning rear wheels.

2. Description of the Relevant Art

Four-wheel-steering systems for use in automobiles are roughly classified into those in which front and rear wheels are mechanically coupled to each other and those in which rear wheels are turned by an actuator without mechanical connection to front wheels.

In the latter system using an actuator, when reactive forces from the road are applied to the rear wheels, the rear wheels may be turned by such reactive forces since the driver is unable to feel those reactive foeces because the rear wheels are not mechanically coupled to the front wheels and hence to the steering wheel.

Japanese Laid-Open Patent Publication No. 61-196870 published Sept. 1, 1986 and Japanese Laid-Open Utility Model Publication No. 61-31972 published Feb. 26, 1986 disclose steering mechanisms each having an actuator or electric motor for turning vehicle wheels, the mechanism including a locking device or arrangement for preventing the wheels from being turned under external forces.

SUMMARY OF THE INVENTION

It is an object of the present invention to provide a rear wheel steering mechanism for a four-wheel-steerable vehicle, which has a locking device for locking a rack shaft coupled to tie rods against unwanted movement while an actuator for turning the rear wheels is being de-energized.

According to the present invention, a rear wheel steering mechanism for use in a vehicle having steerable front and rear wheels, the front wheels being steerable by a steering wheel, includes an actuator, turning means operatively coupled between the actuator and the rear wheels for turning the rear wheels in response to energization of the actuator, and locking means responsive to de-energization of the actuator for locking the turning means. The locking means comprises a longer arm on which first and second gears are rotatably mounted, a shorter arm pivotally coupled to the longer arm, a stopper coupled to the shorter arm and engageable with the second gear, and a spring acting on the stopper for normally urging the stopper into engagement with the second gear, the actuator comprising an electric motor angularly movable with respect to the second gear.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
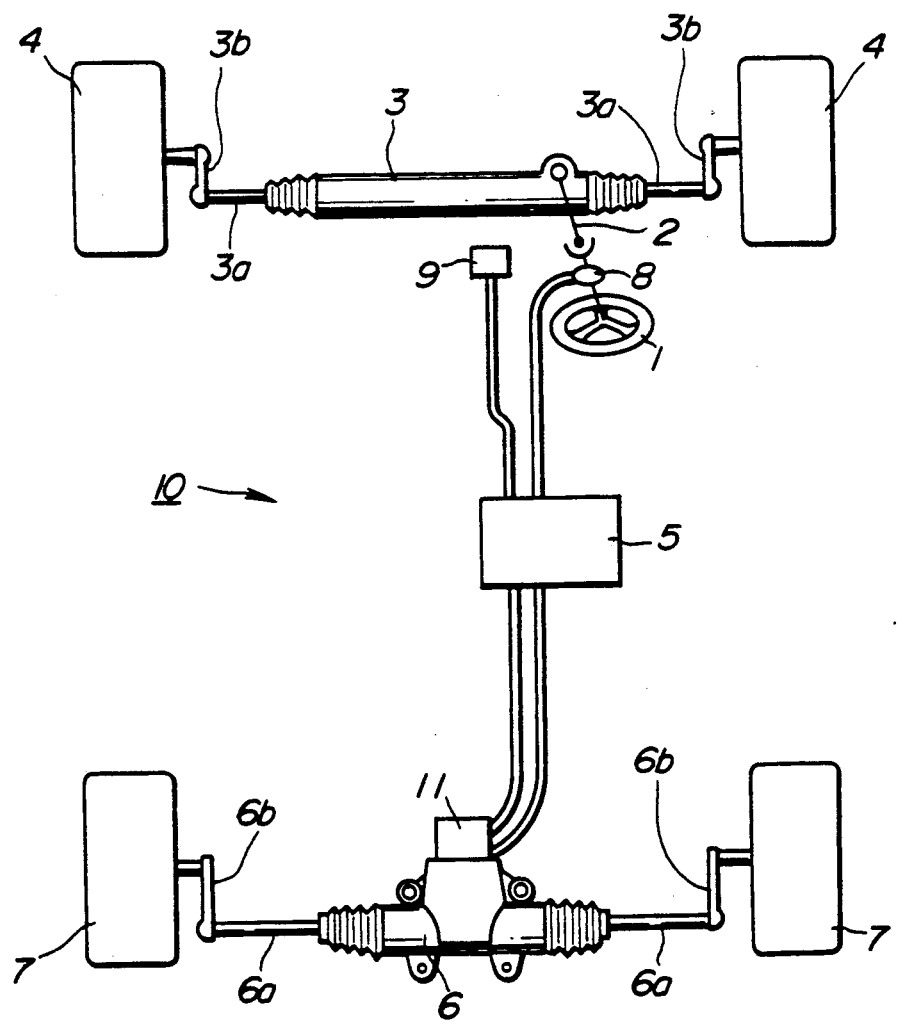
FIG. 1 is a plan view of a four-wheel-steering system including a rear wheel steering mechanism according to the present invention.

FIG. 1 shows a four-wheel-steering system, generally designated by the reference numeral 10, incorporated in an automobile with steerable front and rear wheels. A steering wheel 1 is operatively coupled by a steering shaft 2 to a front-wheel-steering gearbox 3 that is operatively connected through tie rods 3a and knuckle arms 3b to two, laterally spaced front wheels 4. Therefore, rotation of the steering wheel 1 is transmitted via the steering shaft 2 to the gearbox 3 and converted by the rack-and-pinion mechanism in the gearbox 3 to lateral linear movement for moving the tie rods 3a and the knuckle arms 3b to turn the front wheels 4. The above arrangement for turning the front wheels 4 is of a known nature.

The four-wheel-steering system 10 also includes a control unit 5 and a rear-wheel-steering gearbox 6 operatively connected through tie rods 6a and knuckle arms 6b two, laterally spaced rear wheels 7. The control unit 5 is supplied with a front wheel steering signal from a steering angle detector 8 mounted on the steering shaft 2 and an automobile speed sensor 9 for controlling an actuator 11 of the gearbox 6. Thus, the rear wheels 6 are turned by the gearbox 6 actuated by the actuator 11 that is controlled by a control signal from the control unit 5 based on information on the front wheel steering angle and information on the automobile speed.

Figure 2:
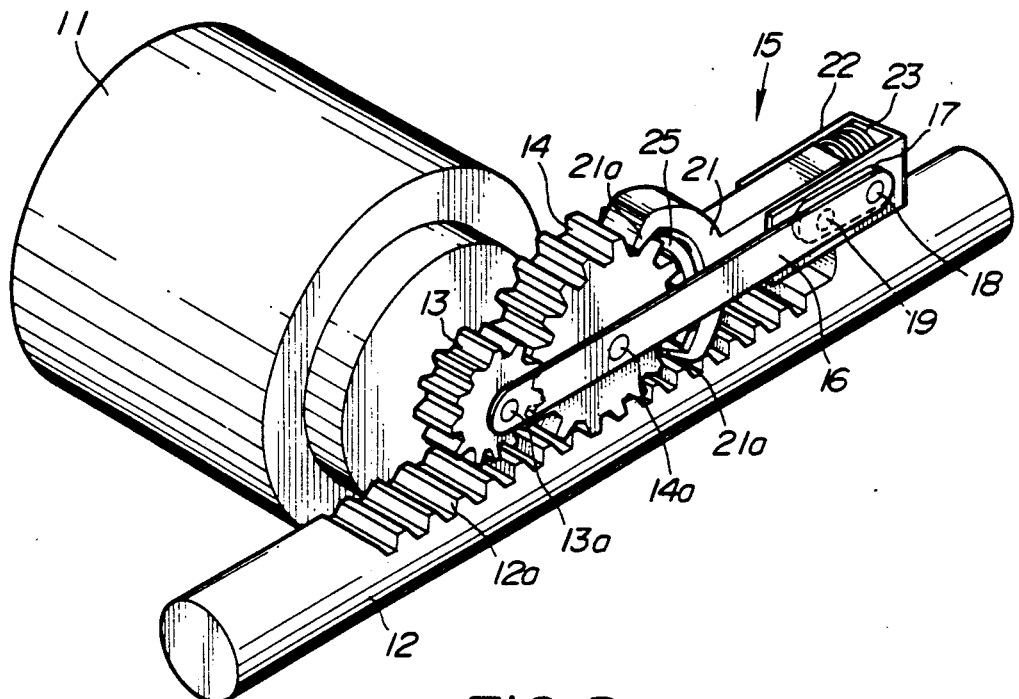
FIG. 2 is an enlarged fragmentary perspective view of the rear wheel steering mechanism.

As shown in FIG. 2, the rear-wheel-steering gearbox 6 inlcudes a rack shaft 12 coupled to the tie rods 6a and having rack teeth 12a. The actuator 11 which may comprise an elecric motor has an output shaft coupled to a pinion 13. A larger-diameter main gear 14 is normally held in mesh with the pinion 13 and the rack teeth 12a, the main gear 14 and the pinion 13 being coupled to a locking device 15.

Figure 3:
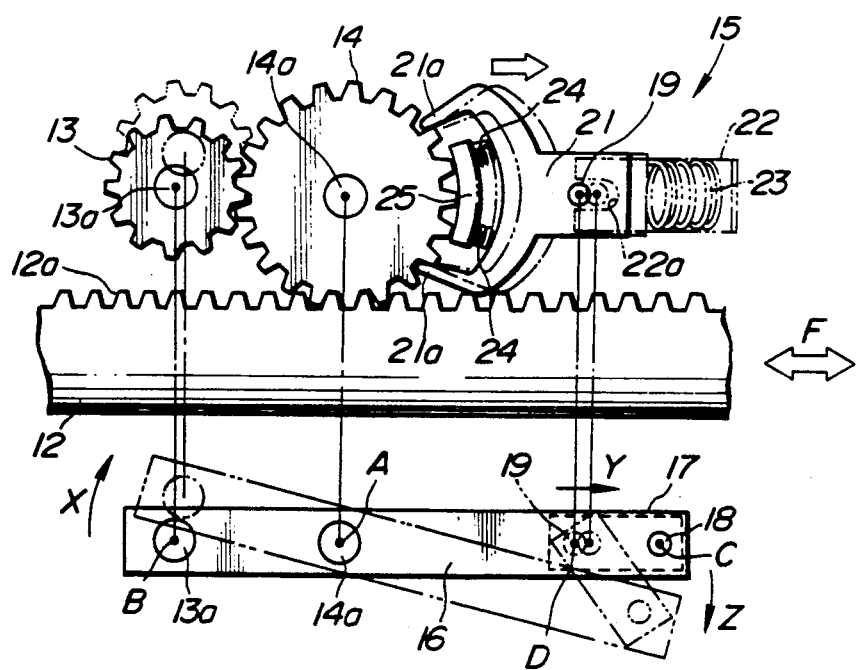
FIG. 3 is a fragmentary elevational view showing operation of the rear wheel steering mechanism.

As illustrated in FIGS. 2 and 3, the locking device 15 essentially comprises a longer arm 16, a shorter arm 17, a stopper 21, and a spring 23. Rhe pinion 13 has its shaft 13a rotatably journalled in the lefthand (as shown) end of the longer arm 16, and the main gear 14 has its shaft 14a rotatably journalled in an intermediate portion of the arm 16. The longer arm 16 lies substantially horizontally along the rack shaft 12. The shorter arm 17 has a righthand end pivotally coupled to the righthand end of the longer arm 16 by means of a pin 18. The stopper 21 has a righthand end pivotally coupled to the lefthand end of the shorter arm 17 by means of a pin 19.

The stopper 21 has a bifurcated lefthand end having spaced fingers 21a engaging upper and lower teeth of the main gear 14. The righthand end of the stopper 21 is horizontally slidably fitted in a channel-shaped guide 22 which is fixedly mounted in the gearbox 6 and has horizontal recesses 22a defined in its opposite side walls and guiding the pin 19 therein. The stopper 21 is normally urged into engagement with the main gear 14 under resilient forces of the compression coil spring 23 disposed under compression between the righthand end of the stopper 21 and the closed end of the guide 22.

An arcuate slider 25 is positioned between the fingers 21a of the stopper 21 and normally urged into sliding contact with the outer peripheral surface of gear teeth of the main gear 14 under resilient forces of two compression coil springs 24 disposed between the stopper 21 and the slider 25.

The shaft 14a of the main gear 14 is supported in the rear-wheel-steering gearbox 6 so that the longer arm 16 is swingable about the central axis A of the main gear 14. The motor 11 with the shaft 13a of the pinion 13 being supported on the lefthand end of the longer arm 16 is movably housed in the gearbox 6 such that the motor 11 may be swingable about the central axis A through a prescribed small angle.

The locking device 15 operates as follows: For turning the rear wheels 7, a force F (FIG. 3) is required to move the rack shaft 12 in its longitudinal direction. When the motor 11 is energized by a control signal from the control unit 5, the pinion 13 is rotated to rotate the main gear 14. Since the fingers 21a of the stopper 21 engage the main gear 14 under the resiliency of the spring 23 and hence the main gear 14 is locked against rotation, the pinion 13 revolves around the main gear 14, i.e., the central axis B of the motor 11 swings around the center A of the main gear 14.

The longer arm 16 is therefore swung about the center A of the main gear 14 in the direction of the arrow X, and the center C of the pin 18 is also turned around the center A in the direction of the arrow Z, resulting in swinging movement of the shorter arm 17 in the direction of the arrow Z. Since the slider 25 is resiliently held against gear teeth of the main gear 14 under the bias of the springs 24, the stopper 21 is prevented from being vertically tilted because of reactive forces applied by the springs 24 to the stopper 21. The center D of the pin 19 by which the stopper 21 and shorter arm 17 are coupled to each other is thus moved to right in the directin of arrow Y (as shown) upon the swinging movement of the shorter arm 17.

The stopper 21 is now retracted out of engagement with the main gear 14 aganist the resiliency of the spring 23. When the longer arm 16 swings beyond a certain angle, therefore, the main gear 14 is unlocked by the stopper 21. Subsequently, rotation of the pinion 13 is transmitted through the main gear 14 to the rack shaft 12, which is linearly moved in its longitudinal direction to turn the rear wheels 7.

When the motor 11 is de-energized, the stopper 21 moves back into engagement with the main gear 14 under the resiliency of the spring 23, and at the same time the pinion 13 and hence the motor 11 return to their original positions through backward swinging movement of the shorter and longer arms 17, 16. The locking device 15 is thus actively responsive to de-energization of the motor 11.

With the motor 11 de-energized, the main gear 14 remains locked aganinst rotation by the stopper 21 and hence the rack shaft 12 meshing with the main gear 14 also remains locked against linear movement. Consequently, the rack shaft 12 is prevented from moving even when reactive forces are applied from the road to the rear wheels 7. Therefore, the rear wheels 7 are prevented from being undesirably turned due to external forces imposed thereon, and the motor 11 is protected from external forces which would otherwise be transmitted thereto from the rear wheels 7 through the gearbox 6.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A rear wheel steering mechanism for use in a vehicle having steerable front and rear wheels, the front wheels being steerable by a steering wheel, said rear wheels steering mechanism comprising:

an actuator:

turning means operatively coupled between said actuator and the rear wheels for turning the rear wheels in response to energization of said actuator; and locking means responsive to de-energization of said actuator for locking said turning means;

said turning means comprising gear means coupled to said actuator and shaft means operatively coupled to the rear wheels for turning the rear wheels in response to operation of said gear means actuated by said actuator;

said shaft means comprising a rack shaft operatively coupled to the rear wheels;

said gear means comprising a first gear connected to said actuator and a second gear meshing with said first gear and said rack shaft;

said locking means comprising a longer arm on which said first and second gears are rotatably mounted, a shorter arm pivotally coupled to said longer arm, a stopper coupled to said shorter arm and engageable with said second gear, and a spring acting on said stopper for normally urging said stopper into engagement with said second gear, said actuator comprising an electric motor angularly movable with respect to said second gear.

2. A rear wheel steering mechanism according to claim 1, wherein said stopper has a pair of spaced fingers engageable with teeth of said second gear.

3. A rear wheel steering mechanism for use in a vehicle having steerable front and rear wheels, the front wheels being steerable by a steering wheel, said rear wheel steering mechanism comprising:

an actuator:

tuning means operatively coupled between said actuator and the rear wheels for turning the rear wheels in response to energization of said actuator; and locking means responsive to de-energization of said actuator for locking said turning means:

said locking means including a stopper which moves into engagement with the turning means when the actuator is de-energized.

4. A rear wheel steering mechanism according to claim 3, wherein said locking means further includes a slider for preventing the stopper from being vertically tilted when it engages the turning means.

* * * * *

UNITED STATES PATENT AND TRADEMARK OFFICE
CERTIFICATE OF CORRECTION

PATENT NO. : 5,096,014
DATED : March 17, 1992
INVENTOR(S) : Abe et al.

It is certified that error appears in the above-identified patent and that said Letters Patent is hereby corrected as shown below:

Column 2, line 37, change "elecric" to --electric--,
         line 67, change "surface" to --surfaces--.

Column 3, line 35, after "to" (second occurrence) insert --the--,
         line 36, change "directin" to --direction--,
         line 39, change "aganist" to --against--.

Column 4, line 34, (claim 1, line 21), after "shaft;" insert --and--.

Signed and Sealed this

First Day of June, 1993

Attest:

MICHAEL K. KIRK

Attesting Officer

Acting Commissioner of Patents and Trademarks